United States Patent
Wu

(10) Patent No.: US 10,816,834 B2
(45) Date of Patent: Oct. 27, 2020

(54) BACKLIGHT MODULE, DISPLAY DEVICE AND DRIVING METHOD THEREOF

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/574,130

(22) Filed: Sep. 18, 2019

(65) Prior Publication Data

US 2020/0012129 A1 Jan. 9, 2020

Related U.S. Application Data

(62) Division of application No. 15/540,338, filed as application No. PCT/CN2016/101551 on Oct. 9, 2016, now Pat. No. 10,459,260.

(30) Foreign Application Priority Data

Jan. 15, 2016 (CN) .......................... 2016 1 0029351

(51) Int. Cl.
  *F21V 8/00* (2006.01)
  *G02F 1/13* (2006.01)
  *G02F 1/13357* (2006.01)

(52) U.S. Cl.
  CPC ......... *G02F 1/1323* (2013.01); *G02B 6/0036* (2013.01); *G02B 6/0038* (2013.01); *G02B 6/0076* (2013.01); *G02F 1/133615* (2013.01); *G02B 6/004* (2013.01); *G02B 6/0068* (2013.01); *G02F 1/133602* (2013.01); *G02F 1/133606* (2013.01); *G02F 2001/133626* (2013.01)

(58) Field of Classification Search
  CPC .................................................. G02B 6/0076
  See application file for complete search history.

(56) References Cited

U.S. PATENT DOCUMENTS 5,956,107 A * 9/1999 Hashimoto ............ G01D 11/28
  349/64
5,959,711 A   9/1999 Silverstein et al.
  (Continued)

FOREIGN PATENT DOCUMENTS

CN   1614476 A    5/2005
CN   101261389 A  9/2008
  (Continued)

OTHER PUBLICATIONS

Search Report from International Application No. PCT/CN2016/101551 dated Dec. 26, 2016.
  (Continued)

*Primary Examiner* — Sean P Gramling
(74) *Attorney, Agent, or Firm* — Calfee, Halter & Griswold LLP

(57) ABSTRACT

A backlight module, a display device and a driving method are disclosed. The backlight module includes a first light guide plate and a second light guide plate arranged oppositely, a first light source and a second light source. A surface of the first light guide plate facing the second light guide plate is a light exit surface of the first light guide plate. The first light source is arranged at a light entrance surface of the first light guide plate. The second light source is arranged at a light entrance surface of the second light guide plate. The first light guide plate includes a light guide element guiding light along a direction perpendicular to the light exit surface of the first light guide plate. The second light guide plate includes a scattering element.

6 Claims, 8 Drawing Sheets

(56) References Cited

U.S. PATENT DOCUMENTS

| | | | |
|---|---|---|---|
| 6,123,431 A | 9/2000 | Teragaki et al. | |
| 2006/0109396 A1* | 5/2006 | Tsai | G02B 6/0038 |
| | | | 349/65 |
| 2014/0085570 A1 | 3/2014 | Kuwata et al. | |
| 2015/0369999 A1 | 12/2015 | Wu | |

FOREIGN PATENT DOCUMENTS

| | | |
|---|---|---|
| CN | 101440919 A | 5/2009 |
| CN | 102853346 A | 1/2013 |
| CN | 104110650 A | 10/2014 |
| CN | 103562618 A | 2/2015 |
| CN | 105487292 A | 4/2016 |
| TW | 201232122 A | 8/2012 |

OTHER PUBLICATIONS

First Office action from Chinese Application No. 201610029351.4 dated Feb. 6, 2017.
Second Office action from Chinese Application No. 201610029351.4 dated Jul. 17, 2017.
Third Office action from Chinese Application No. 201610029351.4 dated Dec. 19, 2017.
Fourth Office action from Chinese Application No. 201610029351.4 dated Jun. 8, 2018.

\* cited by examiner

BACKLIGHT MODULE, DISPLAY DEVICE AND DRIVING METHOD THEREOF

RELATED APPLICATIONS

The present application is a divisional application of U.S. Ser. No. 15/540,338, filed Jun. 28, 2017 which is the U.S. national phase entry of the international application PCT/CN2016/101551, with an international filing date of Oct. 9, 2016, which claims the benefit of Chinese Patent Application No. 201610029351.4, filed on Jan. 15, 2016, the entire disclosures of which are incorporated herein by reference.

TECHNICAL FIELD

The present invention relates to the field of display technology, in particular to a backlight module, a display device and a driving method thereof.

BACKGROUND

Display devices are used in all aspects of people's daily work and life. Normally, a display device has a large viewing angle range during normal operation, and the displayed image can be seen from the front and the side of the display device. However, in daily life and work, people often need confidential display on the display device, for example: in a public office, a user does not want other people to see the information displayed on his laptop screen from the side. The so-called "privacy display" means that the viewing angle range of the display device is small. A clear image thus can be seen from the front of the display device, while the clear image cannot be seen from the side of the display device. Through privacy display, user information can be protected effectively from malicious stealing, thereby avoiding the disclosure of user information.

A display device with an anti-peeping film can be switched between a normal display mode and a privacy display mode. As shown in FIG. 1, an anti-peeping film has superfine louver structures Q. When the display device is switched from a normal display mode to a privacy display mode, the anti-peeping film is covered on the display surface of the display device. The superfine louver structures Q in the anti-peeping film can block the light beams emitted to both sides of the pixel P in the display device, without affecting the light beam emitted to the front of the pixel P, so that the viewing angle range of the display device is reduced, realizing privacy display. On the contrary, when the display device needs to be switched from a privacy display mode to a normal display mode, the anti-peeping film should be removed from the display device, so that normal display can be realized.

SUMMARY

The inventor has realized that, to realize switching between a normal display mode and a privacy display mode with an anti-peeping film, the anti-peeping film should either be fixed on the display device or removed from the display device, and the user should carry the anti-peeping film, therefore switching between these display modes is not convenient.

The embodiments of the invention provide a backlight module, a display device and a driving method thereof. By improving the structure of the backlight module in the display device, the display device can be switched conveniently between a normal display mode and a privacy display mode.

To this end, the embodiments of the invention provide the following solutions.

According to a first aspect of the invention, a backlight module is provided. The backlight module includes a first light guide plate and a second light guide plate arranged oppositely, a first light source and a second light source. A surface of the first light guide plate facing the second light guide plate is a light exit surface of the first light guide plate. The first light source is arranged at a light entrance surface of the first light guide plate. The second light source is arranged at a light entrance surface of the second light guide plate. The first light guide plate includes a light guide element guiding light along a direction perpendicular to the light exit surface of the first light guide plate. The second light guide plate includes a scattering element.

With such a configuration, the divergence degree of light emitted from the first light source and exiting from the first light guide plate is smaller than the divergence degree of light emitted from the second light source and exiting from the second light guide plate.

In certain exemplary embodiments, the scattering element is a recess or protrusion arranged on a light exit surface of the second light guide plate. Alternatively, the scattering element is a recess or protrusion arranged on a surface of the second light guide plate facing the first light guide plate.

In certain exemplary embodiments, the light guide element includes a plurality of optical fibers, each of the plurality of optical fibers extends from a surface of the first light guide plate departing from the second light guide plate to the light exit surface of the first light guide plate. A surface of the first light guide plate departing from the second light guide plate is the light entrance surface of the first light guide plate.

In certain exemplary embodiments, each optical fiber is perpendicular to the light exit surface of the first light guide plate.

In certain exemplary embodiments, an orthographic projection of the scattering element on the light exit surface of the first light guide plate is staggered from an end portion of the optical fiber extending to the light exit surface of the first light guide plate.

In certain exemplary embodiments, the first light source is a surface light source.

In certain exemplary embodiments, the light entrance surface of the first light guide plate is a lateral surface of the first light guide plate. The light guide element includes a plurality of optical fibers. Each optical fiber extends from the light entrance surface of the first light guide plate and extends parallel to the light exit surface of the first light guide plate. A plurality of light outlets are provided on a sidewall of each optical fiber. The plurality of light outlets are located in the light exit surface of the first light guide plate.

In certain exemplary embodiments, an orthographic projection of the scattering element on the light exit surface of the first light guide plate is staggered from the light outlets.

In certain exemplary embodiments, the backlight module further includes a reflective plate arranged on a side of the first light guide plate departing from the second light guide plate.

In certain exemplary embodiments, the plurality of optical fibers are arranged in the interior of the first light guide plate without intervals or at equal intervals. The plurality of light outlets of each optical fiber are arranged at equal intervals.

Alternatively, a distribution density of the plurality of light outlets on each optical fiber increases as an optical distance from the first light source increases.

In certain exemplary embodiments, the first light source is a strip light source.

In certain exemplary embodiments, the first light guide plate includes a light guide plate body and a narrow viewing angle structure arranged on a light exit surface of the light guide plate body. The narrow viewing angle structure is capable of reducing a divergence degree of light emitted from the first light source and exiting from the light guide plate body.

In certain exemplary embodiments, the narrow viewing angle structure includes a plurality of blades parallel to each other, the plurality of blades are arranged at equal intervals and perpendicular to the light exit surface of the light guide plate body.

In certain exemplary embodiments, an orthographic projection of the scattering element on the light exit surface of the light guide plate body overlaps with an orthographic projection of the blades on the light exit surface of the light guide plate body.

In certain exemplary embodiments, the narrow viewing angle structure includes a plurality of convergent lenses arranged in an array on the light exit surface of the light guide plate body.

In certain exemplary embodiments, an orthographic projection of the scattering element on the light exit surface of the light guide plate body is staggered from an orthographic projection of the convergent lenses on the light exit surface of the light guide plate body.

In certain exemplary embodiments, a surface of the light guide plate body departing from the second light guide plate is the light entrance surface of the first light guide plate. Alternatively, a lateral surface of the light guide plate body is the light entrance surface of the first light guide plate, and the backlight module further includes a reflective plate arranged on a side of the light guide plate body departing from the second light guide plate.

In certain exemplary embodiments, a size of the scattering element is a nanometer level size.

In certain exemplary embodiments, the scattering element is a recess, and nanometer particles are arranged in the recess.

In certain exemplary embodiments, a material of the second light guide plate is glass.

In certain exemplary embodiments, the first light guide plate and the second light guide plate are integrally formed.

In certain exemplary embodiments, the refractive index of the first light guide plate is smaller than the refractive index of the second light guide plate.

Based on the above mentioned solutions of the backlight module, a second aspect of the invention provides a display device. The display device includes a display panel and the backlight module according to the first aspect of the invention. The backlight module is superposed on a light entrance surface of the display panel.

Based on the above mentioned solution of the display device, a third aspect of the invention provides a driving method for driving the display device according to the second aspect of the invention. The method includes the following steps. For privacy display on the display device, only the first light source of the display device is turned on. For normal display on the display device, the second light source of the display device is turned on; alternatively, the first light source and the second light source of the display device can be turned on.

In certain exemplary embodiments, when the first light source and the second light source of the display device are turned on for normal display on the display device, the brightness of the first light source can be adjusted, so that a superimposed brightness of the first light source and the second light source is equal to a required brightness value for normal display.

In the certain exemplary embodiments of the present application, two light guide plates are provided in the backlight module, these two light guide plates are arranged opposite to each other, and each of the light guide plates corresponds to a separate light source. The divergence degree of light emitted from the first light source and exiting from the first light guide plate is smaller than the divergence degree of light emitted from the second light source and exiting from the second light guide plate. The backlight module can be used to provide light to a display panel of a display device. The first light source can be turned on if privacy display is required. Light emitted from the first light source exits from the first light guide plate, and the divergence degree of the outgoing light is relatively small. The light beam is incident on the bottom surface of the second light guide plate so that a large divergence degree can be avoided after the light beam passes through the second light guide plate. Therefore, the light beam can pass through the display panel with a relatively small divergence degree, and the viewing angle of the display panel is small, thereby realizing privacy display. If normal display is required, the second light source of the display device is turned on, alternatively, the first light source and the second light source of the display device can both be turned on. Light emitted by the second light source exits from the second light guide plate, and the divergence degree of the outgoing light is relatively large, so that the viewing angle of the display panel is large, thereby realizing normal display. In the embodiments of the present application, the display device can be switched conveniently between a normal display mode and a privacy display mode only by selectively turning on or turning off the two light sources in the backlight module. The anti-peeping film is not required, and the convenience of switching between the two display modes is improved.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only exemplary embodiments of the invention, and for those of ordinary skills in the art, other drawings may be obtained according to these drawings under the premise of not paying out creative work.

REFERENCE SIGNS

P—pixel; Q—superfine louver structure; 10—backlight module; 11—first light guide plate; A—optical fiber; B—scattering element; C—light outlet; D—narrow viewing angle structure; D1—matrix material; D2—blade; D3—convergent lens; E—light guide plate body; 12—second light guide plate; 13—first light source; 14—second light source; 15—reflective plate; a1—light exit surface; a2—bottom surface; a3—first lateral surface; a4—second lateral surface; 20—display panel; 21—first substrate; 22—second substrate.

DETAILED DESCRIPTION OF THE INVENTION

In the following, in order to make the purposes, features and advantages of this application clearer and easy to be understood, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

It should be noted that the "viewing angle" described in the following embodiments refers to an angle between a line of sight and a baseline. When an observer in front of the display device observes the image displayed on the display device, a line connecting the position of the observer and the center of the display device is the line of sight, and a line passing through the center of the display device and perpendicular to the display plane of the display device is the baseline. On the basis of this, the "viewing angle range" described in the following embodiments refers to a range, within which an observer can observe a clear image when the observer in front of the display device observes the image displayed on the display device. In short, an observer with a viewing angle within the "viewing angle range" can observe a clear image, while an observer with a viewing angle beyond the "viewing angle range" cannot observe the displayed image or can only observe a blurred image.

Embodiment 1

Figure 1:
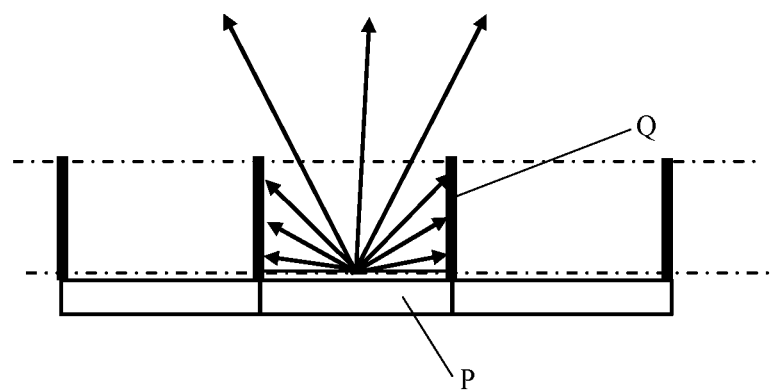
FIG. 1 is an optical path diagram of a prior art using an anti-peeping film for privacy display.
Figure 2:
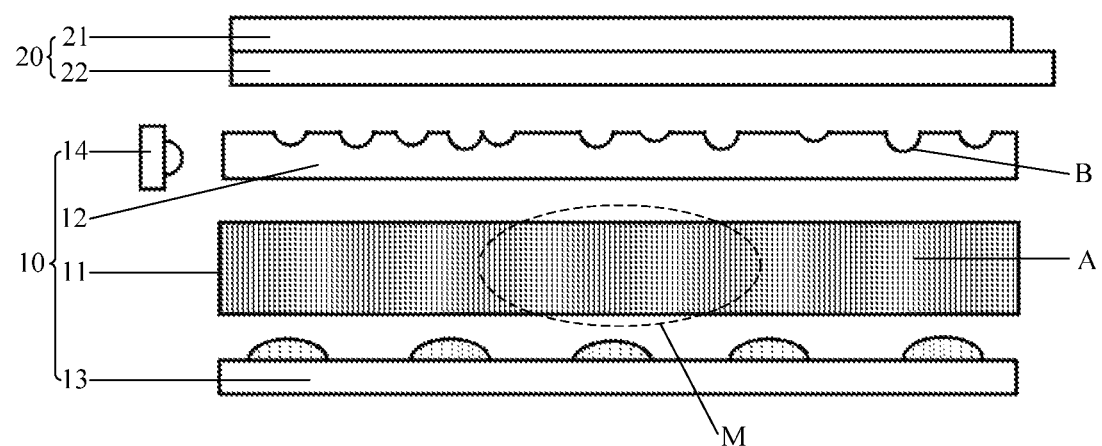
FIG. 2 is a structural schematic diagram of a display device according to an embodiment of the invention.

The embodiment provides a backlight module. As shown in FIG. 2, the backlight module 10 includes a first light guide plate 11 and a second light guide plate 12 arranged oppositely, a first light source 13 and a second light source 14. A surface of the first light guide plate 11 facing the second light guide plate 12 is a light exit surface of the first light guide plate 11. The first light source 13 is arranged at a light entrance surface of the first light guide plate 11. The second light source 14 is arranged at a light entrance surface of the second light guide plate 12. The first light guide plate 11 includes a light guide element A guiding light along a direction perpendicular to the light exit surface of the first light guide plate 11. The second light guide plate 12 includes a scattering element B. In particular, the scattering element can be a microstructure for guiding light. For example, the light guide plate has regular structures with an uneven shape. Specifically, the light guide plate can have spherical recess structures or protruding structures provided on the light exit surface of the light guide plate.

The divergence degree of light emitted from the first light source 13 and exiting from the first light guide plate 11 is small, therefore, if the first light source 13 is turned on and the second light source 14 is turned off, the divergence degree of light emitted from the first light guide plate 11 is small. During passing through the second light guide plate 12, since the divergence degree of light emitted from the first light guide plate 11 is small, it can be deemed that the light beam emitted from the first light guide plate 11 is incident on the second light guide plate 12 in a direction perpendicular to or approximately perpendicular to the second light guide plate 12. Therefore, the light beam will not be scattered to a great degree by the second light guide plate 12. After passing through the second light guide plate 12, the divergence degree of the light beam remains small, i.e., the divergence degree of light provided by the backlight module 10 is small. Further, since the backlight module 10 provides the display panel 20 with the light beam for displaying, the divergence degree of light emitted from the display panel 20 is small, so that the viewing angle range of the display panel 20 is small. A user in front of the display panel 20 can observe a clear image, and the other person cannot see a clear image from the side of the display panel 20. Therefore, privacy display can be realized.

If the second light source 14 is turned on, light emitted from the second light source 14 enters the second light guide plate 12 from the lateral surface of the second light guide plate 12. The light beam is guided by the second light guide plate 12 and emitted from the light exit surface of the second light guide plate 12 with a large divergence degree. In this situation, the divergence degree of the light beam provided by the backlight module 10 is large, regardless of whether the first light source 13 is turned on. Further, since the backlight module 10 provides the display panel 20 with the light beam for displaying, the divergence degree of light emitted from the display panel 20 is large, so that the viewing angle range of the display panel 20 is large. A user either in front of the display panel 20 or on the side of the display panel 20 can observe a clear image. Therefore, normal display can be realized.

It can be seen that in this embodiment, by selectively turning on the first light source 13 and/or the second light source 14, the backlight module 10 can be switched between a mode providing light with a small divergence degree and a mode providing light with a large divergence degree. Therefore, when the backlight module 10 provides the display panel 20 with light required for displaying, the display panel 20 can be switched between a small viewing angle range and a large viewing angle range, the switching between the privacy display mode and the normal display mode is thus realized. The anti-peeping film in the prior art is not required. It is possible to realize the switching between these two display modes by simply operating the first light source 13 and the second light source 14 only through a button or a click operation, thereby improving the convenience of switching between these two display modes.

In certain exemplary embodiments, the scattering element B is a recess or protrusion arranged on a surface of the second light guide plate 12 departing from the first light guide plate 11. Alternatively, the scattering element B is a recess or protrusion arranged on a surface of the second light guide plate 12 facing the first light guide plate 11.

Embodiment 2

Figure 3:
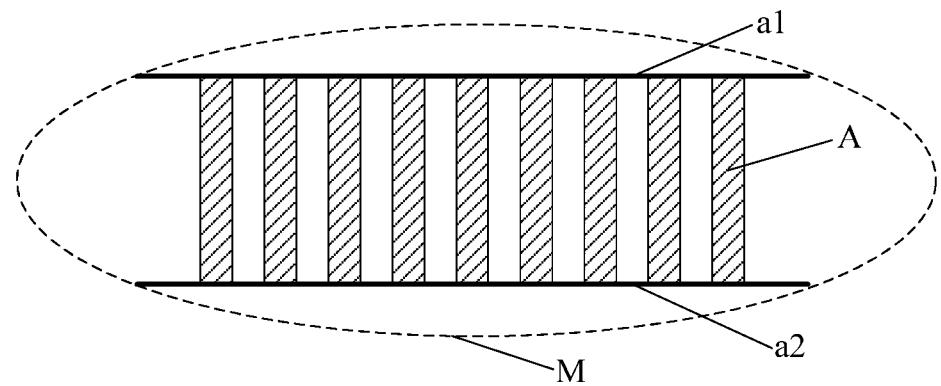
FIG. 3 is an enlarged view of the region M in FIG. 2.

Based on Embodiment 1, as shown in FIG. 2 and FIG. 3, in this embodiment, optical fibers A are applied in the first light guide plate 11, so that the divergence degree of light emitted from the first light source 13 and passing through the first light guide plate 11 is small.

In certain exemplary embodiments, the light guide element includes a plurality of optical fibers A. Each of the plurality of optical fibers A extends from a surface of the first light guide plate 11 departing from the second light guide plate 12 to the light exit surface of the first light guide plate 11. A surface of the first light guide plate 11 departing from the second light guide plate 12 is the light entrance surface of the first light guide plate 11.

Figure 4:
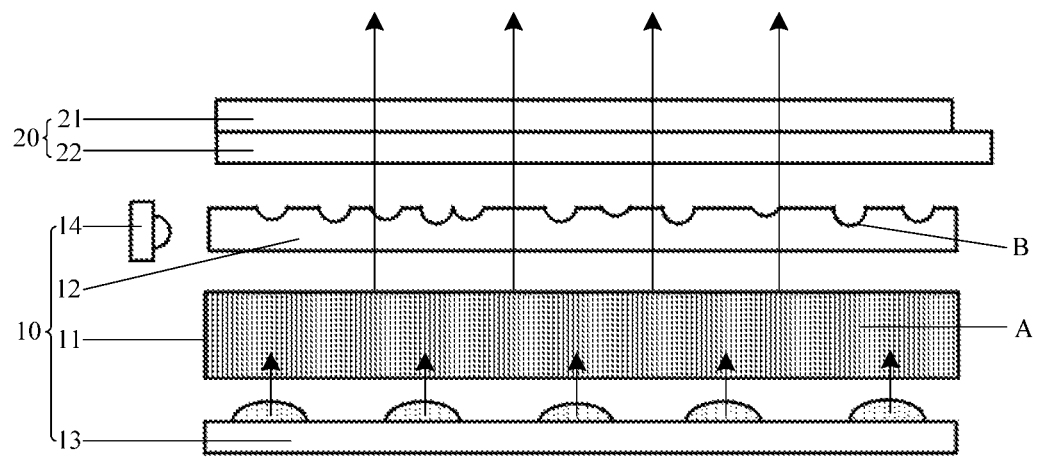
FIG. 4 is an optical path diagram of the display device shown in FIG. 2 in a privacy display mode.

As shown in FIG. 4, if the first light source 13 is turned on, light emitted from the first light source 13 enters the optical fiber A from the bottom surface a2 of the first light guide plate 11. It is then totally reflected in the optical fiber A and transmitted to the light exit surface a1 of the first light guide plate 11. Since the light beam is transmitted in the optical fiber A, the light beam is hardly scattered within the first light guide plate 11. The light beam can be emitted in a direction perpendicular to or approximately perpendicular to the light exit surface a1 of the first light guide plate 11, so that the divergence degree of light emitted from the first light guide plate 11 is small.

In certain exemplary embodiments, the first light source 13 is a surface light source, so that the uniformity of light emitted from the first light guide plate 11 can be further increased. A surface light source can be formed with a number of point light sources such as LED (light emitting diode) lamp beads, which are arranged in an array.

By adjusting the inclination of the optical fiber A with respect to the light exit surface a1 of the first light guide plate 11, the divergence degree of the outgoing light can be adjusted, and the viewing angle range of privacy display can further be adjusted. Alternatively, each optical fiber A is perpendicular to the light exit surface a1 of the first light guide plate 11, so that light emitted from the first light guide plate 11 is substantially perpendicular to the light exit surface a1 of the first light guide plate 11, and the divergence degree is further reduced. The viewing angle range of the display panel 20 for privacy display is relatively small, and the confidentiality of privacy display is effectively improved.

In certain exemplary embodiments, an orthographic projection of the scattering element B on the light exit surface of the first light guide plate 11 is staggered from an end portion of the optical fiber A extending to the light exit surface of the first light guide plate 11. In this manner, when the light beam emitted from the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

Optionally, the viewing angle range of the display panel 20 for privacy display is ±30°, i.e., [−30°, +30°]. According to the optional viewing angle range, the angle of the light beam emitted from the first light guide plate 11 is within a range of 60° to 120° (the normal line of the light exit surface of the first light guide plate 11 is the baseline). The inclination of the optical fiber A with respect to the light exit surface a1 of the first light guide plate 11 can be designed based on this angle range.

Figure 6A:
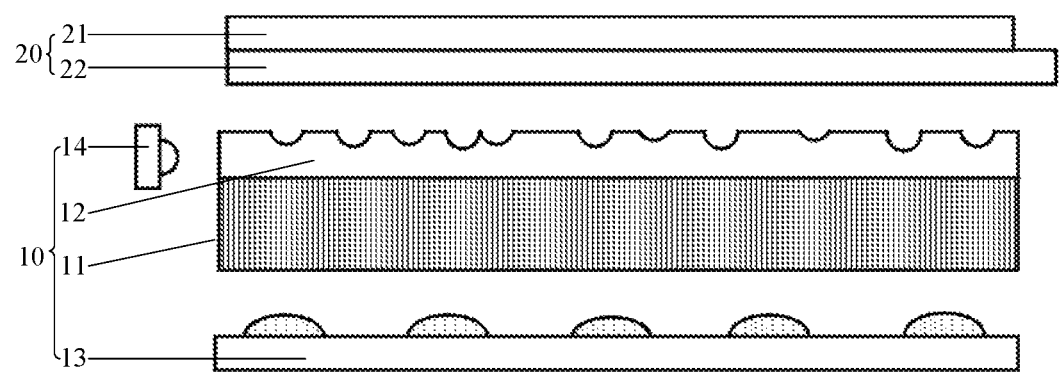
FIG. 6*a* is a structural schematic diagram of a display device according to an embodiment of the invention.

As shown in FIG. 6a, in order to improve the utilization of light, optionally, the first light guide plate 11 and the second light guide plate 12 are integrally constructed. Light leakage can be effectively reduced when the light beam is transmitted from the first light guide plate 11 to the second light guide plate 12, thereby improving the utilization of light. Moreover, since the first light guide plate 11 and the second light guide plate 12 are integrally constructed, the assembling process of the backlight module 10 can be simplified, thereby improving the production efficiency. Further, the main body of the first light guide plate 11 and the main body of the second light guide plate 12 can be made of the same material, such as glass or acrylic material.

Figure 6B:
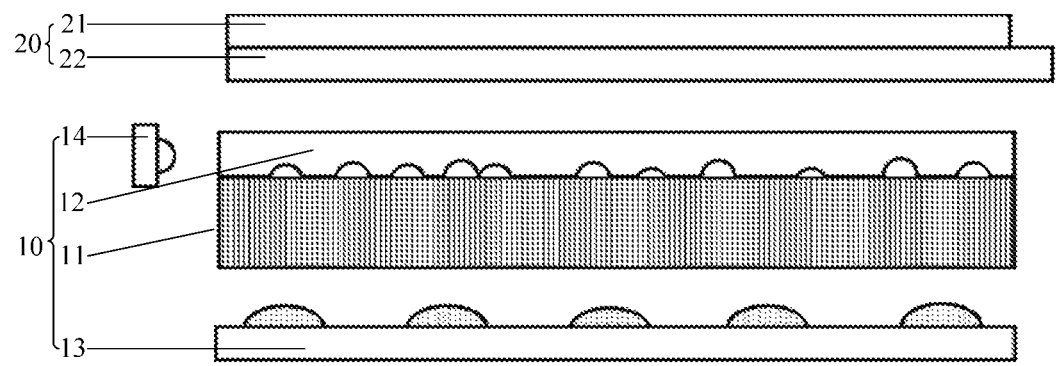
FIG. 6*b* is a structural schematic diagram of a display device according to another embodiment of the invention.

As shown in FIG. 6b, a recess can be used as a scattering element. Some recesses can be arranged on a surface of the second light guide plate 12 facing the first light guide plate 11. The first light guide plate 11 and the second light guide plate 12 can be bonded together. The recess creates an air gap between these two light guide plates, preventing the extraction of light from the first light guide plate 11 at the position of the air gap. Light from the first light guide plate 11 can pass through directly at other positions around the air gap. In this arrangement, light from the first light guide plate 11 is not scattered by the scattering element (i.e., the recess), therefore, a complicated alignment process or a particular design is not required.

Figure 7:
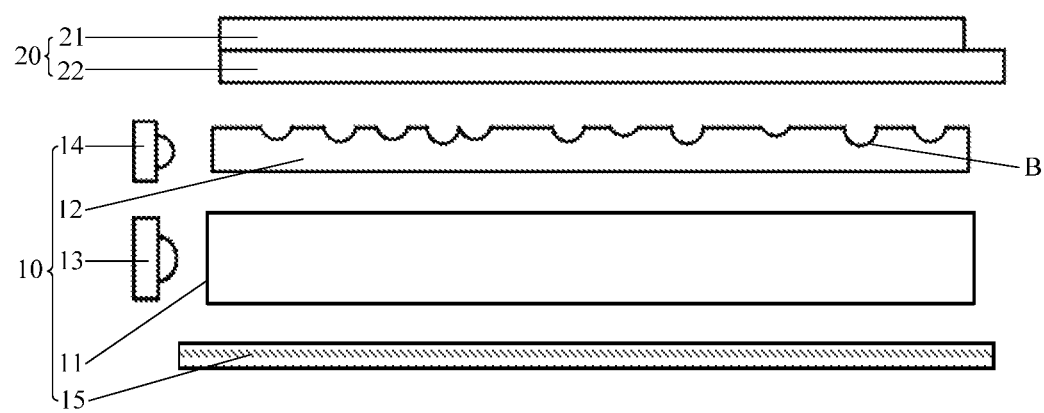
FIG. 7 is a structural schematic diagram of a display device according to yet another embodiment of the invention.
Figure 8:
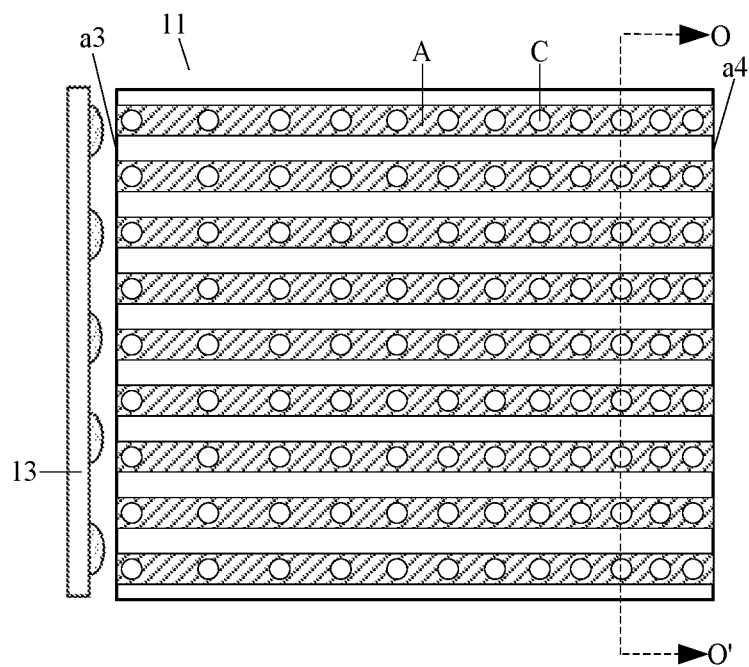
FIG. 8 is a top view of the first light guide plate and the first light source in the display device shown in FIG. 7.
Figure 9:
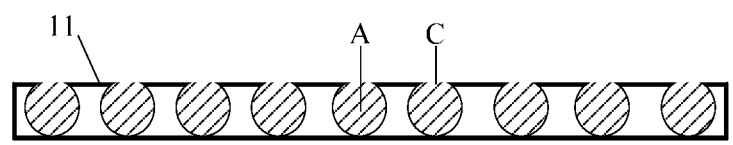
FIG. 9 is a cross-sectional view of the first light guide plate along the line OO' in FIG. 8.

As shown in FIG. 7, FIG. 8, and FIG. 9, for the first light guide plate 11 provided with optical fibers A, the first light source 13 can be arranged on any one of the plurality of lateral surfaces of the first light guide plate 11, so that the overall thickness of the backlight module 10 can be reduced. In certain exemplary embodiments, the light entrance surface of the first light guide plate 11 is a lateral surface a3 of the first light guide plate. The light guide element includes a plurality of optical fibers A. Each optical fiber A extends from the light entrance surface a3 of the first light guide plate 11 and extends parallel to the light exit surface of the first light guide plate 11. A plurality of light outlets C are provided on a sidewall of each optical fiber A. The plurality of light outlets C are located in the light exit surface of the first light guide plate. In certain exemplary embodiments, each optical fiber A is arranged parallel to the light exit surface of the first light guide plate 11. As a result, light transmitted in the optical fiber A can be emitted from the light exit surface of the first light guide plate 11 through these light outlets C.

In the abovementioned first light guide plate 11, light emitted from the first light source 13 enters the optical fiber A of the first light guide plate 11 through the first lateral surface a3 of the first light guide plate 11 and is totally reflected in the optical fiber A. The light beam can thus be transmitted from the first lateral surface a3 to the second lateral surface a4. Moreover, when the light beam is transmitted from the first lateral surface a3 to the second lateral surface a4, light reaching the light outlet C is emitted from the light outlet C. Since the diameter of the optical fiber A is small, the diameter of the light outlet C on the sidewall of the optical fiber A is small. The light outlet C is located on the light exit surface of the first light guide plate 11, so that the light beam can be emitted in a direction perpendicular to or approximately perpendicular to the light exit surface of the first light guide plate 11, and the divergence degree of light emitted from the first light guide plate 11 is small.

In FIG. 8, each optical fiber A extends from the light entrance surface a3 of the first light guide plate 11 and extends parallel to the light exit surface of the first light guide plate 11 to another lateral surface a4. It can be understood by those skilled in the art that the optical fiber A can also be curved and extend along the light exit surface of the first light guide plate 11. Therefore, the number of the optical fiber can be one or more.

In certain exemplary embodiments, an orthographic projection of the scattering element on the light exit surface of the first light guide plate is staggered from the light outlets. In this manner, when the light beam emitted from the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

In certain exemplary embodiments, the backlight module further includes a reflective plate 15 arranged on a side of the first light guide plate 11 departing from the second light guide plate 12, thereby reflecting light passing through the gap between the optical fibers A and reaching the reflective plate 15.

In order to improve the uniformity of light emitted from the first light guide plate 11 and increase the brightness uniformity of the image displayed on the display panel 20, in certain exemplary embodiments, the plurality of optical fibers A of the first light guide plate 11 are arranged in the interior of the first light guide plate without intervals or at equal intervals. The plurality of light outlets C of each optical fiber A are arranged at equal intervals. Alternatively, from the first lateral surface a3 of the first light guide plate 11 to the second lateral surface a4, the distribution density of the plurality of light outlets C on each optical fiber A increases. That is, the distribution density of the plurality of light outlets C on each optical fiber A increases as an optical distance from the first light source increases. In the first light guide plate 11, the light intensity at the position distant from the first light source 13 is small, therefore, the design on the distribution density of the light outlets C can further improve the uniformity of light emitted from the first light guide plate 11.

In certain exemplary embodiments, the first light source 13 is a strip light source. The first lateral surface a3 of the first light guide plate 11 also has a stripe shape. The extending direction for the strip shape of the first light source 13 can be parallel to the extending direction for the strip shape of the first lateral surface a3 of the first light guide plate 11. The strip light source can be formed by arranging a plurality of point light sources in a straight line.

For the abovementioned first light guide plate 11 in which the optical fiber A is parallel to the light exit surface, in order to improve the utilization of light, the first light guide plate 11 and the second light guide plate 12 can be integrally constructed. Further, the main body of the first light guide plate 11 and the main body of the second light guide plate 12 can be made of the same material. Light leakage can thus be effectively reduced when the light beam is transmitted from the first light guide plate 11 to the second light guide plate 12, and the assembling process of the backlight module 10 can be simplified.

As shown in FIG. 2 and FIGS. 4-7, in the surfaces of the second light guide plate 12, the surface opposite to the light exit surface is referred as a bottom surface. The second light guide plate 12 has a characteristic that the second light guide plate 12 can guide and uniformize the light beam entering from the lateral surface of the second light guide plate 12 and is capable of converting the light beam entering from the lateral surface into a uniform surface light source, and the outgoing light has a large divergence degree. Therefore, if the second light source 14 is turned on, the backlight module 10 can provide an outgoing light beam with a large divergence degree to meet the need for normal display of the display panel 20. For the light entering from the bottom surface of the second light guide plate 12, most of the incident light is perpendicular to the light entrance surface of the second light guide plate 12, the second light guide plate 12 cannot scatter the light beam to a great degree. As a result, if the second light source 14 is turned off and the first light source 13 is turned on, after the light beam with a small divergence degree emitted from the first light guide plate 11 passes through the second light guide plate 12, the divergence degree changes little and remains small, thereby providing appropriate light for privacy display of the display panel 20.

Figure 5:
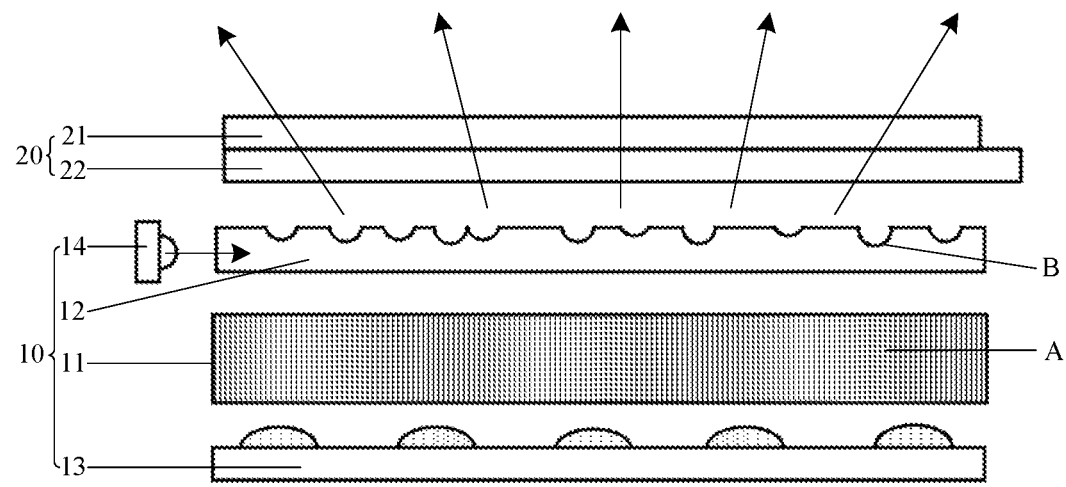
FIG. 5 is an optical path diagram of the display device shown in FIG. 2 in a normal display mode.

To ensure the abovementioned characteristic of the second light guide plate 12, a plurality of scattering elements B can be provided on the light exit surface of the second light guide plate 12. The scattering element B can be, for example, a protrusion or recess. As shown in FIG. 2, a plurality of recesses are provided on the light exit surface of the second light guide plate 12. The light entering from the lateral surface of the second light guide plate 12 is totally reflected and scattered by the scattering element B, so that the incident light is transmitted in the entire second light guide plate 12 and emitted within a large angle range with respect to the normal line of the light exit surface of the second light guide plate 12. The backlight module 10 thus provides light with a large divergence degree, as shown in FIG. 5. Most of light entering from the bottom surface of the second light guide plate 12 is perpendicular to or approximately perpendicular to the light exit surface of the second light guide plate 12, and a considerable portion of the light beam directly passes through the regions of the light exit surface where the scattering element B is not provided. Therefore, the divergence degree of light is not increased a lot, as shown in FIG. 4.

In order to reduce the scattering effect of the second light guide plate 12 on the light beam entering from the bottom surface, under the premise that the second light guide plate 12 can guide and uniformize the light beam entering from the lateral surface of the second light guide plate 12, the area ratio occupied by the scattering element B on the light exit surface of the second light guide plate 12 can be reduced. For example, the size of the scattering element B can be reduced. On the basis of this, the number of the scattering elements B can be reduced so that most of light entering from the bottom surface of the second light guide plate 12 can directly pass through the regions of the light exit surface where the scattering element B is not provided. It is thus ensured that if the first light source 13 is turned on for realizing privacy display, the divergence degree of the light beam with a relatively small divergence degree emitted from the first light guide plate 11 is almost unchanged after passing through the second light guide plate 12. In certain exemplary embodiments, the size of the scattering element B is a nanometer level size.

According to the abovementioned solution, for the first light guide plate 11 with one end of the optical fiber A extending to the bottom surface a2 and the other end extending to the light exit surface a1 (shown in FIG. 3), when the scattering element B is provided on the second light guide plate 12, the orthographic projection of the scattering element B on the light exit surface a1 of the first light guide plate 11 is staggered from an end portion of the optical fiber A extending to the light exit surface a1 of the first light guide plate. Therefore, when the light beam emitted from the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

As shown in FIG. 8 and FIG. 9, in the first light guide plate 11, one end of the optical fiber A extends to the first lateral surface a3, the other end of the optical fiber A extends to the second lateral surface a4, and a plurality of light outlets C are provided on a sidewall of each optical fiber A. For the first light guide plate 11, to provide the scattering element B on the second light guide plate 12, the orthographic projection of the scattering element B on the light exit surface a1 of the first light guide plate can be arranged as staggered from the light outlet C. Therefore, when the light beam emitted from the light outlets C of the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

In order to increase the brightness of the second light guide plate 12 when the second light source 14 is turned on, the scattering element B arranged on the light exit surface of the second light guide plate 12 can be a recess, and nanoparticles are arranged in the recess. The nanoparticles refer to microscopic particles (also known as quantum dots) of nanometer scale, and the nanoparticles can reduce the loss of light and improve the light utilization.

Further, on the basis of the scattering element B arranged on the light exit surface of the second light guide plate 12, the scattering element B can be arranged on the other surface (e.g., the bottom surface) of the second light guide plate 12 to further increase the uniformity of light emitted from the second light guide plate 12.

Optionally, the viewing angle range of the display panel 20 for normal display is ±90°. According to the optional viewing angle range, in certain exemplary embodiments, the angle of the light beam emitted from the second light guide plate 12 is within a range of 0° to 180° (the normal line of the light exit surface of the second light guide plate 12 is the baseline). The scattering element B on the second light guide plate 12 can be designed based on the divergence degree, so that the divergence degree of the emitted light beam under the effect of the scattering element B can satisfy the requirement.

In order to improve the transmittance of light, in certain exemplary embodiments, the material of the second light guide plate 12 is a material with a high transmittance (e.g., glass). Therefore, it is ensured that light can pass through the second light guide plate 12 with a large transmittance when the second light source 14 is not turned on.

Embodiment 3

Figure 10:
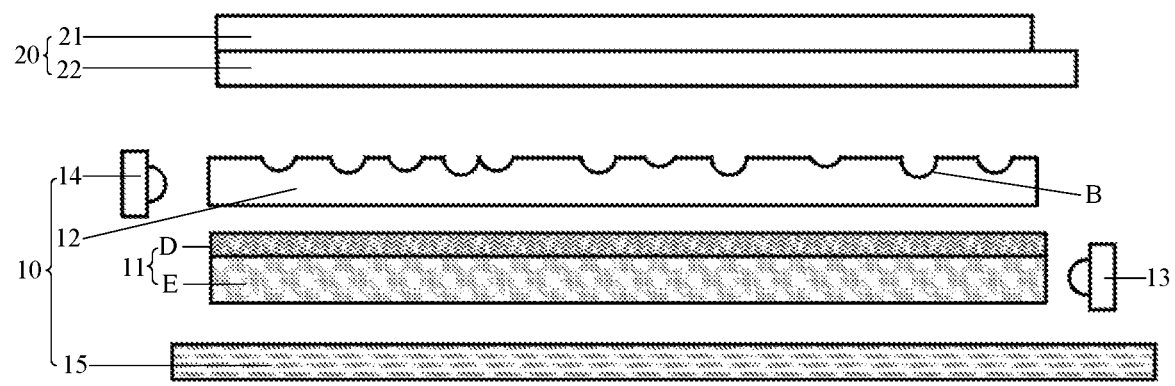
FIG. 10 is a structural schematic diagram of a display device according to an embodiment of the invention.

Based on Embodiment 1, as shown in FIG. 10, in this embodiment, a narrow viewing angle structure D is provided on the light exit surface of the first light guide plate 11, so that the divergence degree of light emitted from the first light guide 13 and passing through the first light guide plate 11 is small.

In certain exemplary embodiments, the first light guide plate 11 includes a light guide plate body E and a narrow viewing angle structure D arranged on a light exit surface of the light guide plate body E. The narrow viewing angle structure D is capable of reducing the divergence degree of light emitted from the first light source 13 and exiting from the light guide plate body E of the first light guide plate 11. A variety of structures can be used to realize the narrow viewing angle structure D capable of reducing the divergence degree of light. In the following, two kinds of the narrow viewing angle structures are illustrated exemplarily.

Figure 11:
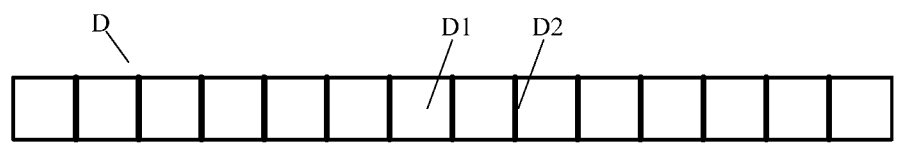
FIG. 11 is a structural schematic diagram of a narrow viewing angle structure in a display device according to an embodiment of the invention.

As shown in FIG. 11, in certain exemplary embodiments, the narrow viewing angle structure D includes a plurality of blades D2 parallel to each other, the plurality of blades D2 are arranged at equal intervals and perpendicular to the light exit surface of the light guide plate body E. When light is transmitted from the light guide plate body E to the narrow viewing angle structure D, the blades D2 can block the light scattered sideways without affecting light emitted perpendicular to the light exit surface of the light guide plate body E, thereby reducing the divergence degree of light emitted from the first light guide plate 11. In addition, the narrow viewing angle structure D can further include a matrix material D1 to support the blades D2.

By applying higher blades D2 and smaller intervals, the divergence degree of the emitted light under the effect of the blades D2 can be smaller. However, since the blades D2 reduce the divergence degree of the emitted light by blocking light, the blades D2 can cause loss of light. Therefore, the height and interval of the blades D2 should also have a certain upper limit, so that the divergence degree of the emitted light meets the requirements and the loss of light is within an acceptable range.

A vertical line passing through the center of the first light guide plate 11 and perpendicular to the light exit surface a1 of the first light guide plate 11 is taken as a baseline. In certain exemplary embodiments, the angle of light emitted from the first light guide plate 11 is in the range of 60° to 120° (the normal line of the light exit surface of the first light guide plate 11 is the baseline). The height, interval, etc. of the blades D2 can be specifically designed based on the optional angle range.

In certain exemplary embodiments, an orthographic projection of the scattering element on the light exit surface of the light guide plate body overlaps with an orthographic projection of the blades on the light exit surface of the light guide plate body. In this manner, when the light beam emitted from the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

Figure 12:
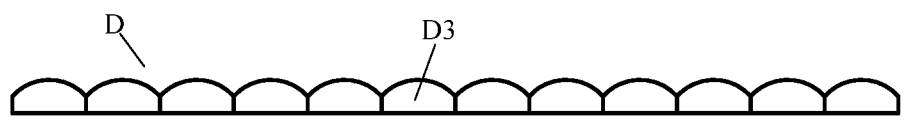
FIG. 12 is a structural schematic diagram of a narrow viewing angle structure in a display device according to another embodiment of the invention.

As shown in FIG. 12, in certain exemplary embodiments, the narrow viewing angle structure D includes a plurality of convergent lenses D3. The plurality of convergent lenses D3 are arranged in an array on the light exit surface of the light guide plate body E. When a light beam is transmitted from the light guide plate body E to the narrow viewing angle structure D, the convergent lens D3 can refract the light beam, thereby achieving the effect of converging the light beam, and reducing the divergence degree of the light beam emitted from the first light guide plate 11.

In certain exemplary embodiments, an orthographic projection of the scattering element on the light exit surface of the light guide plate body is staggered from an orthographic projection of the convergent lenses on the light exit surface of the light guide plate body. In this manner, when the light beam emitted from the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

A vertical line passing through the center of the first light guide plate 11 and perpendicular to the light exit surface a1 of the first light guide plate 11 is taken as a baseline. In certain exemplary embodiments, the angle of light emitted from the first light guide plate 11 is in the range of 60° to 120° (the normal line of the light exit surface of the first light guide plate 11 is the baseline). The number of the convergent lenses D3, the side length, the thickness, the focal length, and other parameters of the convergent lenses D3 can be specifically designed based on the optional angle range, so that the divergence degree of the light beam emitted by the convergent lens D3 meets the requirements.

The narrow viewing angle structure D can be directly formed on the light guide plate body E. It can also be formed on a film substrate and adhered to the light guide plate body E with glue such as double-sided adhesive or other glue.

In the embodiment, the surface of the first light guide plate 11 opposite to the light exit surface thereof can be referred to as a bottom surface. The first light source 13 can be arranged on the bottom surface of the first light guide plate 11. For such an arrangement of the first light source 13, in certain exemplary embodiments the first light source 13 is a surface light source, and the structure of the surface light source can refer to the corresponding portions in Embodiment 2. The first light source 13 can also be arranged on the lateral surface of the first light guide plate 11 to reduce the overall thickness of the backlight module 10. For such an arrangement of the first light source 13, in certain exemplary embodiments the first light source 13 is a strip light source, and the structure of the strip light source can be referred to the corresponding portions in Embodiment 2. Further, in order to improve the utilization of light, a reflective plate 15 is arranged on the bottom surface of the first light guide plate 11, so that light transmitted to the reflective plate 15 can be reflected back into the first light guide plate 11.

The structure of the second light guide plate 12 in the backlight module 10 provided in the present embodiment can be referred to the portion of the second light guide plate 12 in Embodiment 2.

It should be noted that, for the first light guide plate 11 in which the narrow viewing angle structure D includes a plurality of blades D2, when arranging the scattering element B on the second light guide plate 12, the orthographic projection of the scattering element B on the light exit surface of the light guide plate body E overlaps with the orthographic projection of the blades D2 on the light exit surface of the light guide plate body E. Therefore, when the light beam emitted from the intervals between the blades on the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

In addition, for the first light guide plate 11 in which the narrow viewing angle structure D includes a plurality of convergent lenses D3, when arranging the scattering element B on the second light guide plate 12, the orthographic projection of the scattering element B on the light exit surface of the light guide plate body E overlaps with the orthographic projection of the convergent lenses D3 on the light exit surface of the light guide plate body E. Therefore, when the light beam emitted from the convergent lenses D3 on the first light guide plate 11 passes through the second light guide plate 12, most of the light beam can pass through a region of the second light guide plate 12 without the scattering element B, and the scattering effect of the scattering element B on light emitted from the first light guide plate 11 is reduced.

Figure 13:
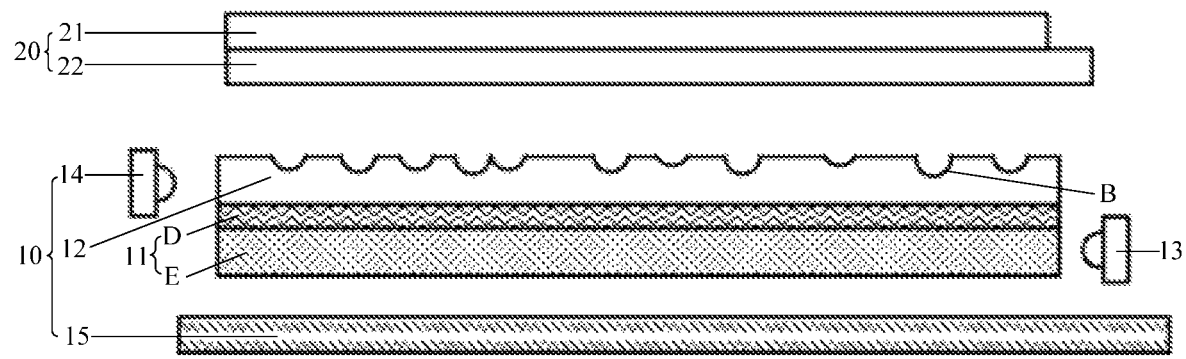
FIG. 13 is a structural schematic diagram of a display device according to an embodiment of the invention.

As shown in FIG. 13, similar to Embodiment 2, in order to improve the utilization of light, the first light guide plate 11 and the second light guide plate 12 of the backlight module 10 in the present embodiment can optionally be integrally formed, thereby improving the utilization of light and simplifying the assembling process of the backlight module 10. Moreover, the main body of the first light guide plate 11 and the main body of the second light guide plate 12 can be made of the same material.

In certain exemplary embodiments, the refractive index of the first light guide plate is smaller than the refractive index of the second light guide plate. In this manner, the ability of the second light guide plate for extracting light from the first light guide plate can further be improved.

Embodiment 4

The embodiment provides a display device. As shown in FIG. 2, FIG. 6, FIG. 7, FIG. 10 and FIG. 13, the display device includes a display panel 20 and a backlight module 10 superposed on a light entrance surface of the display panel 20 (i.e., a surface of the display panel 20 opposite to the display surface thereof). The backlight module 10 is the backlight module according to any one of Embodiment 1, Embodiment 2 and Embodiment 3.

According to the description in Embodiment 1, Embodiment 2 and Embodiment 3, by selectively turning on the first light source 13 and/or the second light source 14, the backlight module 10 can be switched between a mode providing light with a small divergence degree and a mode providing light with a large divergence degree. When the backlight module 10 provides light with a small divergence degree, the viewing angle range of the display device is small, thereby realizing privacy display. When the backlight module 10 provides light with a large divergence degree, the viewing angle range of the display device is large, thereby realizing normal display. Therefore, it is possible to realize the switching between these two display modes by simply operating the first light source 13 and the second light source 14 only through a button or a click operation, thereby improving the convenience of switching between these two display modes.

In order to realize the operation of the first light source 13 and the second light source 14 in the backlight module 10, a corresponding control circuit or program can be provided in a chip of the display device, and the user can either turn on or turn off a light source by clicking the corresponding function key or the icon on the display device. Alternatively, a corresponding switch button can be provided on the display device, the user can either turn on or turn off a light source through actions such as touching, pressing, twisting and flipping.

Optionally, the viewing angle range of the display device in the present embodiment is −30° to +30° during privacy display, and the viewing angle range is −90° to +90° during normal display, i.e., the full viewing angle range.

In the display device provided in the present embodiment, the display panel 20 can include a first substrate 21 and a second substrate 22, and these two substrates can be superimposed together. In certain exemplary embodiments, the display panel 20 is a liquid crystal display panel, thus the first substrate 21 in the display panel 20 can be a color film substrate, and the second substrate 22 can be an array substrate. It can be understood by those skilled in the art that a liquid crystal layer (not shown) is also provided between the color film substrate and the array substrate.

It should be noted that the display device provided by the embodiment can be any product or component with display function, such as mobile phone, tablet computer, TV, display, notebook computer, digital photo frame, navigator and so on.

Embodiment 5

Based on Embodiment 4, an embodiment further provides a driving method for a display device. The driving method can be used for driving the display device according to Embodiment 4. As shown in FIG. 2, FIG. 6, FIG. 7, FIG. 10 and FIG. 13, the method includes the following steps.

For privacy display on the display device, only the first light source 13 of the display device is turned on. When the light beam emitted from the first light guide 13 enters the first light guide plate 11, under the effect of the first light guide plate 11, the divergence degree of the light beam emitted from the first light guide plate 11 is small. In order to ensure that the divergence degree of light provided by the entire backlight module 10 is small, it is necessary to turn off the second light source 14, so that the light beam with a small divergence degree emitted from the first light guide plate 11 passes through the second light guide plate 12 and enters the display panel 20 of the display device. In this manner, the viewing angle range of the display panel 20 is small, realizing privacy display.

Figure 14:
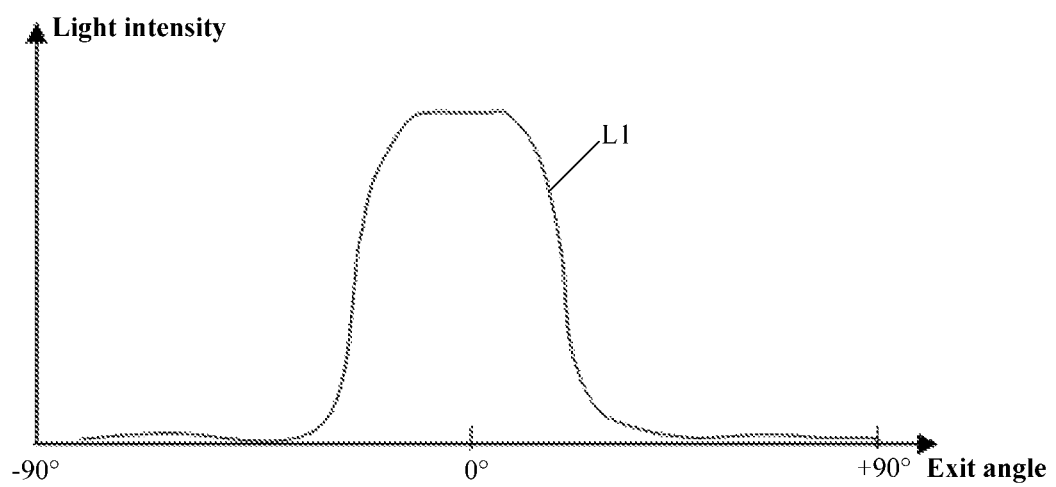
FIG. 14 is a schematic diagram of a relationship between the exit angle of light and the light intensity in an embodiment of the invention.

As shown in FIG. 14, L1 is an exit angle-light intensity curve corresponding to the first light guide plate 11 during privacy display. It can be seen from the curve L1 that with an exit angle of 0° (the normal line of the light exit surface of the first light guide plate 11 is taken as the baseline), the amount of light is large. That is, most of the outgoing light is perpendicular to or approximately perpendicular to the light exit surface of the first light guide plate 11, so that the light intensity reaches the peak value, and the observer in front of the display device can observe a clear image. The amount of light having an exit angle deviated from 0° is drastically reduced, so that the light intensity is abruptly reduced to almost zero, other people cannot observe a clear image from the side of the display device. It should be noted that since the second light source 14 is not turned on during privacy display, the exit angle-light intensity curve corresponding to the second light guide plate 12 is not shown.

For normal display on the display device, the second light source 14 of the display device is turned on. When the light beam emitted from the second light guide plate 12 enters the second light guide plate 12, under the effect of the second light guide plate 12, the divergence degree of the light beam emitted from the second light guide plate 12 is large. As a result, regardless of whether or not the first light source 13 is turned on, the divergence degree of light provided by the entire backlight module 10 is large, normal display is thus realized. It should be noted that, if both the first light source 13 and the second light source 14 are turned on, light emitted from the first light source 13 and exiting from the first light guide plate 11 is superimposed on light emitted from the second light source 14 and exiting from the second light guide plate 12. Therefore, in light provided by the backlight module 10, the amount of light having an exit angle of about 0° is larger than the amount of light having an exit angle close to −90° or +90°, so that the brightness of the image observed by the observer in front of the display device is brighter than the brightness of the image observed from the side of the display device.

Figure 15:
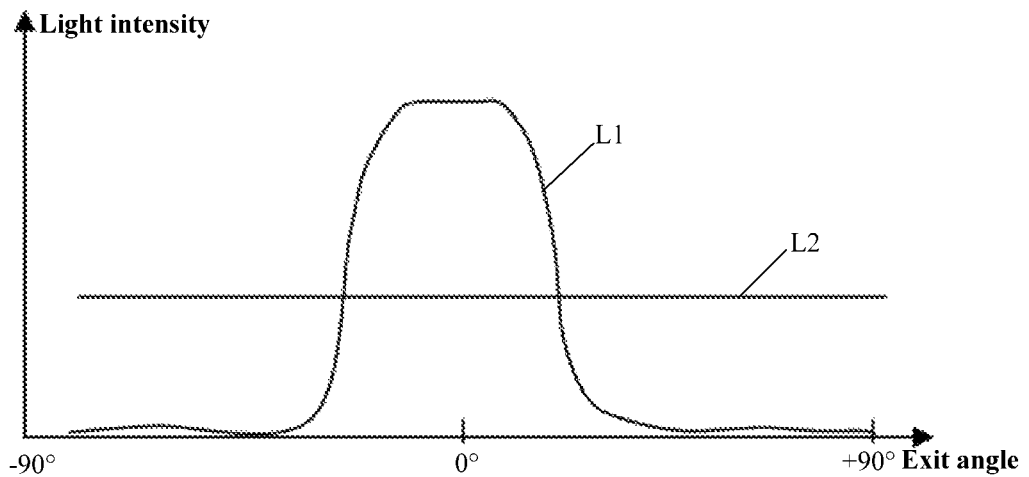
FIG. 15 is a schematic diagram of a relationship between the exit angle of light and the light intensity in another embodiment of the invention.

For example, during privacy display, both the first light source 13 and the second light source 14 are turned on. As shown in FIG. 15, L1 is the exit angle-light intensity curve corresponding to the first light guide plate 11 during normal display. With an exit angle of 0° (the normal line of the light exit surface of the first light guide plate 11 is taken as the baseline), the amount of light is large. The amount of light having an exit angle close to −90° or +90° is drastically reduced. In FIG. 15, L2 is the exit angle-light intensity curve corresponding to the second light guide plate 12 during normal display. In the exit angle range of −90° to +90°, the light distribution corresponding to each exit angle is uniform light emitted from the first light source 13 and exiting from the first light guide plate 11 is superimposed on light emitted from the second light source 14 and exiting from the second light guide plate 12. Therefore, in the exit angle range of −90° to +90°, each of the exit angles corresponds to a certain amount of light and the amount of light corresponding to the exit angle range in the vicinity of 0° is the largest. In this manner, the observer can observe a clear image from the front and the side of the display device, and the brightness of the image observed from the front is higher than the brightness of the image observed from the side.

For the situation in which both the first light source 13 and the second light source 14 are turned on during privacy display, the brightness of the image observed by the observer depends on the superimposed result of the brightness of the first light guide plate 11 and the brightness of the second light guide plate 12. Most light emitted from the first light guide plate 11 has an exit angle of 0°. If the brightness of the first light guide plate 11 is relatively high (e.g., the brightness of the first light guide plate 11 of privacy display still remains), the brightness of the image observed from the front of the display device may be excessively bright, even beyond the preset value of brightness required for normal display, thus stimulating the eyes of the observer.

In order to avoid this problem, it is necessary to reduce the amount of light having an exit angle of about 0° in the light beam provided by the backlight module 10 without reducing the amount of light having an exit angle close to −90° or +90° emitted from the backlight module 10. It is thus necessary to adjust the brightness of the first light guide plate

11. Specifically, the driving method provided in the present embodiment further includes the following step. When the first light source 13 and the second light source 14 of the display device are turned on for normal display on the display device, the brightness of the first light source 13 can be adjusted to control the brightness of the first light guide plate 11, so that the adjusted brightness of the first light guide plate 11 is smaller than the brightness of the first light guide plate 11 during privacy display. Therefore, a superimposed brightness of the first light guide plate 11 and the second light guide plate 12 is equal to or approximately equal to a required brightness value for normal display.

Figure 16:
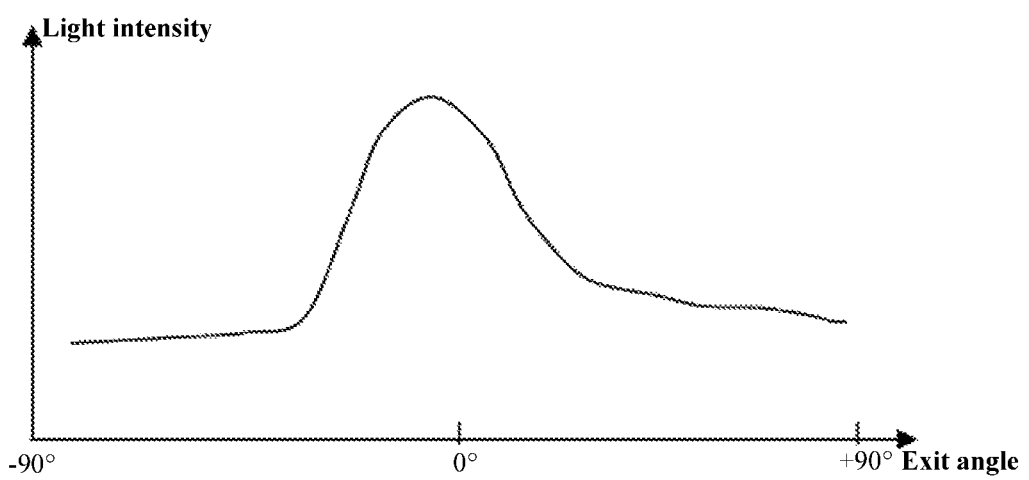
FIG. 16 is a schematic diagram of a relationship between the exit angle of light and the light intensity in yet another embodiment of the invention.

As shown in FIG. 16, an exit angle-light intensity curve is shown, which corresponds to the superimposed brightness of the light beam emitted from the first light source 13 and exiting from the first light guide plate 11 and the light beam emitted from the second light source 14 and exiting from the second light guide plate 12. It can be seen from the curve that the brightness of the image observed by the observer in front of the display device is the brightest, while this brightness is substantially the same as the brightness of the image observed from the front of the display device during privacy display. This shows that compared with the brightness of the first light guide plate 11 during privacy display, the brightness of the first light guide plate 11 is reduced, and the reduced amount is approximately equal to the brightness of the second light guide plate 12.

The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

What is claimed is:

1. A backlight module comprising: a first light guide plate and a second light guide plate arranged oppositely, a first light source and a second light source;

wherein a surface of the first light guide plate facing the second light guide plate is a light exit surface of the first light guide plate; the first light source is arranged at a light entrance surface of the first light guide plate; the second light source is arranged at a light entrance surface of the second light guide plate; the first light guide plate comprises a light guide element guiding light along a direction perpendicular to the light exit surface of the first light guide plate; the second light guide plate comprises a scattering element;

wherein the first light guide plate comprises a light guide plate body and a narrow viewing angle structure arranged on a light exit surface of the light guide plate body of the first light guide plate, and the narrow viewing angle structure is capable of reducing a divergence degree of light emitted from the first light source and exiting from the light guide plate body of the first light guide plate;

wherein the narrow viewing angle structure comprises a plurality of blades parallel to each other, the plurality of blades are arranged at equal intervals and perpendicular to the light exit surface of the light guide plate body of the first light guide plate; and wherein an orthographic projection of the scattering element on the light exit surface of the light guide plate body of the second light guide plate overlaps with an orthographic projection of the blades on the light exit surface of the light guide plate body of the first light guide plate.

2. The backlight module according to claim 1, wherein a surface of the light guide plate body of the first light guide plate departing from the second light guide plate is the light entrance surface of the first light guide plate.

3. The backlight module according to claim 1, wherein a lateral surface of the light guide plate body of the first light guide plate is the light entrance surface of the first light guide plate, and the backlight module further comprises a reflective plate arranged on a side of the light guide plate body of the first light guide plate departing from the second light guide plate.

4. The backlight module according to claim 1, wherein a surface of the light guide plate body of the first light guide plate departing from the second light guide plate is the light entrance surface of the first light guide plate.

5. The backlight module according to claim 1, wherein a lateral surface of the light guide plate body of the first light guide plate is the light entrance surface of the first light guide plate, and the backlight module further comprises a reflective plate arranged on a side of the light guide plate body of the first light guide plate departing from the second light guide plate.

6. A backlight module comprising: a first light guide plate and a second light guide plate arranged oppositely, a first light source and a second light source;

wherein a surface of the first light guide plate facing the second light guide plate is a light exit surface of the first light guide plate; the first light source is arranged at a light entrance surface of the first light guide plate; the second light source is arranged at a light entrance surface of the second light guide plate; the first light guide plate comprises a light guide element guiding light along a direction perpendicular to the light exit surface of the first light guide plate; the second light guide plate comprises a scattering element;

wherein the first light guide plate comprises a light guide plate body and a narrow viewing angle structure arranged on a light exit surface of the light guide plate body of the first light guide plate, and the narrow viewing angle structure is capable of reducing a divergence degree of light emitted from the first light source and exiting from the light guide plate body of the first light guide plate;

wherein the narrow viewing angle structure comprises a plurality of convergent lenses arranged in an array on the light exit surface of the light guide plate body of the first light guide plate; and wherein an orthographic projection of the scattering element on the light exit surface of the light guide plate body of the second light guide plate is staggered from an orthographic projection of the convergent lenses on the light exit surface of the light guide plate body of the first light guide plate.

* * * * *